(12) United States Patent
Kubo et al.

(10) Patent No.: US 12,028,364 B2
(45) Date of Patent: Jul. 2, 2024

(54) COMMUNICATION CONTROL SYSTEM, NETWORK CONTROLLER AND COMPUTER PROGRAM

(71) Applicant: NIPPON TELEGRAPH AND TELEPHONE CORPORATION, Tokyo (JP)

(72) Inventors: Takahiro Kubo, Tokyo (JP); Hiroyuki Uzawa, Tokyo (JP); Yu Nakayama, Tokyo (JP); Daisuke Hisano, Tokyo (JP); Yoichi Fukada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 676 days.

(21) Appl. No.: 17/265,928

(22) PCT Filed: Aug. 15, 2019

(86) PCT No.: PCT/JP2019/032010
§ 371 (c)(1),
(2) Date: Feb. 4, 2021

(87) PCT Pub. No.: WO2020/040027
PCT Pub. Date: Feb. 27, 2020

(65) Prior Publication Data
US 2021/0306362 A1 Sep. 30, 2021

(30) Foreign Application Priority Data
Aug. 23, 2018 (JP) .................. 2018-156585

(51) Int. Cl.
*H04L 9/40* (2022.01)
*H04L 45/00* (2022.01)
*H04L 47/24* (2022.01)

(52) U.S. Cl.
CPC .......... *H04L 63/1425* (2013.01); *H04L 45/66* (2013.01); *H04L 47/24* (2013.01);
(Continued)

(58) Field of Classification Search
CPC ............. H04L 63/1425; H04L 63/1416; H04L 63/162
See application file for complete search history.

(56) References Cited

U.S. PATENT DOCUMENTS 8,798,060 B1 * 8/2014 Vautrin ............... H04L 12/4633
370/466
9,038,182 B2 * 5/2015 Kim .................... H04L 63/1483
726/23
(Continued)

FOREIGN PATENT DOCUMENTS

JP 2006-352669 A 12/2006
JP 2007-243419 A 9/2007
(Continued)

OTHER PUBLICATIONS

Docomo, "Docomo 5G White Paper", Sep. 2014 <https://www.nttdocomo.co.jp/corporate/technology/whitepaper_5g/>.
(Continued)

*Primary Examiner* — Viral S Lakhia
(74) *Attorney, Agent, or Firm* — Harness, Dickey & Pierce, P.L.C.

(57) ABSTRACT

In a communication control system having a plurality of layer 2 switches and a network controller, the network controller includes a determination unit and an instruction unit, the determination unit being configured to determine whether or not a transfer communication flow feature indicating a feature of a communication flow transferred by a layer 2 switch of the plurality of layer 2 switches is similar to an abnormal communication flow feature indicating a feature of a communication flow when an abnormality (Continued)

occurs; and the instruction unit being configured to: output to the layer 2 switch, when the determination unit determines that the transfer communication flow feature is similar to the abnormal communication flow feature, a first instruction to lower priority of transfer processing for the communication flow and a second instruction to duplicate the communication flow to the layer 2 switch; or output the first instruction to the layer 2 switch, and output, to a server detecting a malicious attack, identification information identifying the communication flow having the transfer communication flow feature.

9 Claims, 12 Drawing Sheets

(52) U.S. Cl.
CPC ........ *H04L 63/1416* (2013.01); *H04L 63/162* (2013.01); *H04L 2212/00* (2013.01)

(56) References Cited

U.S. PATENT DOCUMENTS

| | | | | |
|---|---|---|---|---|
| 9,237,094 | B2* | 1/2016 | Shimonishi | H04L 49/3009 |
| 9,485,276 | B2* | 11/2016 | Quinlan | H04L 67/01 |
| 9,953,517 | B2* | 4/2018 | Zhou | H04W 4/023 |
| 10,397,221 | B2* | 8/2019 | Mohamed | H04L 63/062 |
| 10,657,259 | B2* | 5/2020 | Lee | G06N 5/041 |
| 10,721,218 | B2* | 7/2020 | Smith | H04L 45/42 |
| 10,726,128 | B2* | 7/2020 | Krasser | G06N 20/20 |
| 11,443,178 | B2* | 9/2022 | Edwards | H04L 63/1441 |
| 2006/0288413 | A1 | 12/2006 | Kubota | |
| 2013/0111589 | A1* | 5/2013 | Cho | H04L 63/1466 726/23 |
| 2016/0164896 | A1* | 6/2016 | Baldonado | H04L 63/1458 726/23 |
| 2016/0294698 | A1* | 10/2016 | Berberana Fernandez-Murias | H04L 47/12 |
| 2018/0337945 | A1* | 11/2018 | Takabe | H04L 63/1425 |
| 2019/0332769 | A1* | 10/2019 | Fralick | H04L 9/30 |
| 2020/0177625 | A1* | 6/2020 | Rouvinen | H04L 63/1425 |

FOREIGN PATENT DOCUMENTS

| | | |
|---|---|---|
| JP | 2013-192128 A | 9/2013 |
| JP | 2018-026747 A | 2/2018 |

OTHER PUBLICATIONS

Craig Gunther, "What's New in the World of IEEE 802.1 TSN", Standards News, IEEE Communications Magazine, Communications Standards Supplement, Sep. 2016, pp. 12-15.

Takahiro Kubo et al., Layer-2 Network Technology Towards 5G/IoT Era, The Institute of Electronics, Information and Communication Engineers, IEICE Technical Report CS2017-43 (Sep. 2017), pp. 7-12.

Georgios Kambourakis et al., The Mirai Botnet and the IoT Zombie Armies, Milcom 2017 Track 3—Cyber Security and Trusted Computing, pp. 267-272, IEEE, 2017.

Yuhei Hayashi et al., Evaluation of the attack detection method based on duration of continuous packet arrival, The Institute of Electronics, Information and Communication Engineers, IEICE Technical Report ICSS2015-56 (Mar. 2016).

* cited by examiner

| FLOW ID | CYCLE 1 | CYCLE 2 | CYCLE 3 | CYCLE 4 | CYCLE 5 |
|---|---|---|---|---|---|
| A | $X_{A1}$ | $X_{A2}$ | $X_{A3}$ | $X_{A4}$ | $X_{A5}$ |
| B | $X_{B1}$ | $X_{B2}$ | $X_{B3}$ | $X_{B4}$ | $X_{B5}$ |
| C | $X_{C1}$ | $X_{C2}$ | $X_{C3}$ | $X_{C4}$ | $X_{C5}$ |
| D | $X_{D1}$ | $X_{D2}$ | $X_{D3}$ | $X_{D4}$ | $X_{D5}$ |

LT1

| FLOW ID | CYCLE 1 | CYCLE 2 | CYCLE 3 | CYCLE 4 | CYCLE 5 |
|---|---|---|---|---|---|
| 1 | $X_{ddos1}$ | $X_{ddos2}$ | $X_{ddos3}$ | $X_{ddos4}$ | $X_{ddos5}$ |
| 2 | $Y_{ddos1}$ | $Y_{ddos2}$ | $Y_{ddos3}$ | $Y_{ddos4}$ | $Y_{ddos5}$ |
| 3 | $Z_{ddos1}$ | $Z_{ddos2}$ | $Z_{ddos3}$ | $Z_{ddos4}$ | $Z_{ddos5}$ |
| 4 | $W_{ddos1}$ |  | $W_{ddos3}$ |  | $W_{ddos5}$ |

LT2

| L2 SWITCH | MAC#1 | MAC#2 | MAC#3 | MAC#4 | MAC#5 |
|---|---|---|---|---|---|
| 1 | abcd | efgh | ijkl | mnop | qrst |
| 2 | uvwx | yz12 | 3456 | 7890 | ... |
| 3 | ... | ... | | | |
| 4 | ... | ... | | | |

COMMUNICATION CONTROL SYSTEM, NETWORK CONTROLLER AND COMPUTER PROGRAM

CROSS-REFERENCE TO RELATED APPLICATIONS

This application is a 371 U.S. National Phase of International Application No. PCT/JP2019/032010 filed on Aug. 15, 2019, which claims priority to Japanese Application No. 2018-156585 filed on Aug. 23, 2018. The entire disclosures of the above applications are incorporated herein by reference.

TECHNICAL FIELD

The present disclosure relates to a communication control system, a network controller and a computer program.

BACKGROUND ART

In recent years, a wireless access network with a C-RAN (Centralized-Radio Access Network: C-RAN) configuration has been studied for the purpose of efficiently accommodating increasing mobile traffic (see, for example, Non Patent Literature 1). In the C-RAN, many pieces of RE (radio equipment: RE, which is wireless equipment) are densely arranged. Each of the REs is connected to RECs (Radio Equipment Controls: RECs) arranged in an aggregated manner.

In IEEE 802.1CM, studies are underway to accommodate fronthaul traffic in a layer 2 network (hereinafter referred to as "L2 network") (see, for example, Non Patent Literature 2). On the other hand, studies are also underway to accommodate. In an access network, traffic that tolerates delay (hereinafter referred to as delay-tolerant traffic) represented by some of the IoT (Internet of Things: IoT). In view of these, a study on a multi-service accommodation access network in which delay-tolerant traffic is accommodated in the identical L2 network in addition to fronthaul and backhaul has been reported (see, for example, Non Patent Literature 3).

In the multi-service accommodation access network, a large number of terminals may be connected to a server or the like on a network. In this case, a large load can be applied to the connection server and the L2 network. Accordingly, abnormal traffic affecting the service needs to be detected and handled in the L2 network.

CITATION LIST

Non Patent Literature

Non Patent Literature 1: Docomo 5G White Paper, https://www.nttdocomo.co.jp/corporate/technology/whitepaper_5g/, September, 2014 Non Patent Literature 2: Craig Gunther, "What's New in the World of IEEE 802.1 TSN", Standards News, IEEE Communications Magazine, Communications Standards Supplement, September 2016

Non Patent Literature 3: "The Layer-2 Network Technology Towards 5G/IoT Era", IEICE Technical Report, CS2017-43, pp. 7-12, The Institute of Electronics, Information and Communication Engineers, 2017

Non Patent Literature 4: Georgios Kambourakis et al., The Mirai Botnet and the IoT Zombie Armies", Milcom 2017 Track 3—Cyber Security and Trusted Computing, pp. 267-272, IEEE, 2017

SUMMARY OF THE INVENTION

Technical Problem

Abnormal traffic occurs in the access network for various reasons. For example, in a system in which an IoT device uploads data to a server at a given time, burst traffic may occur.

In this case, individual communication frames constituting the burst traffic are valid communication frames output from the IoT device. Therefore, by appropriately dispersing a load in the L2 network, it is possible to avoid the occurrence of a load exceeding the allowable range of processing of the server.

On the other hand, attacks where malicious traffic is transmitted to the server or the L2 network by a lot of IoT devices infected with malware and the like (distributed denial of service (DDoS) attack) have been reported (for example, Non Patent Literature 4). Thus, when the L2 network detects abnormal traffic such as burst traffic, it is demanded to determine whether abnormal traffic is valid traffic or malicious traffic and properly handles the traffic.

However, for analysis of abnormal traffic, if all communication frames distributed to the L2 network are duplicated and the duplicated communication frames are transmitted to a specific analysis server, the traffic increases, disadvantageously applying a large load to the network. In addition, when the duplicated frames are transmitted to the analysis server and analysis results are acquired from the analysis server, the abnormal traffic cannot be quickly handled.

In view of the above circumstances, an object of the embodiments of the present disclosure is to provide a technique capable of handling abnormal frames while suppressing load applied to the network.

Means for Solving the Problem

An aspect of the present disclosure is a communication control system including a plurality of layer 2 switches and a network controller, the network controller having a determination unit and an instruction unit, the determination unit being configured to determine whether or not a transfer communication flow feature indicating a feature of a communication flow transferred by a layer 2 switch of the plurality of layer 2 switches is similar to an abnormal communication flow feature indicating a feature of a communication flow when an abnormality occurs, and the instruction unit being configured to: output to the layer 2 switch, when the determination unit determines that the transfer communication flow feature is similar to the abnormal communication flow feature, a first instruction to lower priority of transfer processing for the communication flow having the transfer communication flow feature determined to be similar and a second instruction to duplicate the communication flow having the transfer communication flow feature determined to be similar; or output, when the determination unit determines that the transfer communication flow feature is similar to the abnormal communication flow feature, the first instruction to the layer 2 switch, and output, to a server detecting a malicious attack, identification information identifying the communication flow having the transfer communication flow feature determined to be similar.

An aspect of the present disclosure is the communication control system described above, wherein the feature is a number of arrived frames for each of the communication flows.

An aspect of the present disclosure is the communication control system described above, wherein the feature is a number of session connection frames for each of the communication flows.

An aspect of the present disclosure is the communication control system described above, wherein, when a mean squared error of the transfer communication flow feature and the abnormal communication flow feature is less than a predetermined threshold, the network controller is configured to determine that the transfer communication flow feature is similar to the abnormal communication flow feature.

An aspect of the present disclosure is the communication control system described above, wherein the instruction unit is configured to output the second instruction to the layer 2 switch in which communication flows to be transferred are most aggregated.

An aspect of the present disclosure is the communication control system described above, wherein, when acquiring the first instruction, the layer 2 switch encapsulates a first layer 2 frame, which is a target frame to be processed, with a second layer 2 frame to which a lower priority value is assigned than the first layer 2 frame.

One aspect of the present disclosure is a network controller including a determination unit and an instruction unit, the determination unit being configured to determine whether or not a transfer communication flow feature indicating a feature of a communication flow transferred by a layer 2 switch is similar to an abnormal communication flow feature indicating a feature of a communication flow when an abnormality occurs, and the instruction unit being configured to: output to the layer 2 switch, when the determination unit determines that the transfer communication flow feature is similar to the abnormal communication flow feature, a first instruction to lower priority of transfer processing for the communication flow having the transfer communication flow feature determined to be similar and a second instruction to duplicate the communication flow having the transfer communication flow feature determined to be similar, or output, when the determination unit determines that the transfer communication flow feature is similar to the abnormal communication flow feature, the first instruction to the layer 2 switch, and output, to a sever detecting a malicious attack, identification information identifying the communication flow having the transfer communication flow feature determined to be similar.

An aspect of the present disclosure is a computer program for causing a computer to function as the network controller described above.

Effects of the Invention

According to the present disclosure, it is possible to quickly handle abnormal frames while suppressing load applied to the network.

BRIEF DESCRIPTION OF DRAWINGS

FIG. 7 is a table illustrating an example of a configuration of a list LT3 held by an abnormal traffic identification unit 250 of the communication control system 1 according to the embodiment of the present disclosure.

DESCRIPTION OF EMBODIMENTS

Embodiments

A communication control system 1 according to an embodiment of the present disclosure will be described below.

Overall Configuration of Communication Control System

Hereinafter, an overall configuration of the communication control system 1 will be described as follows.

Figure 1:
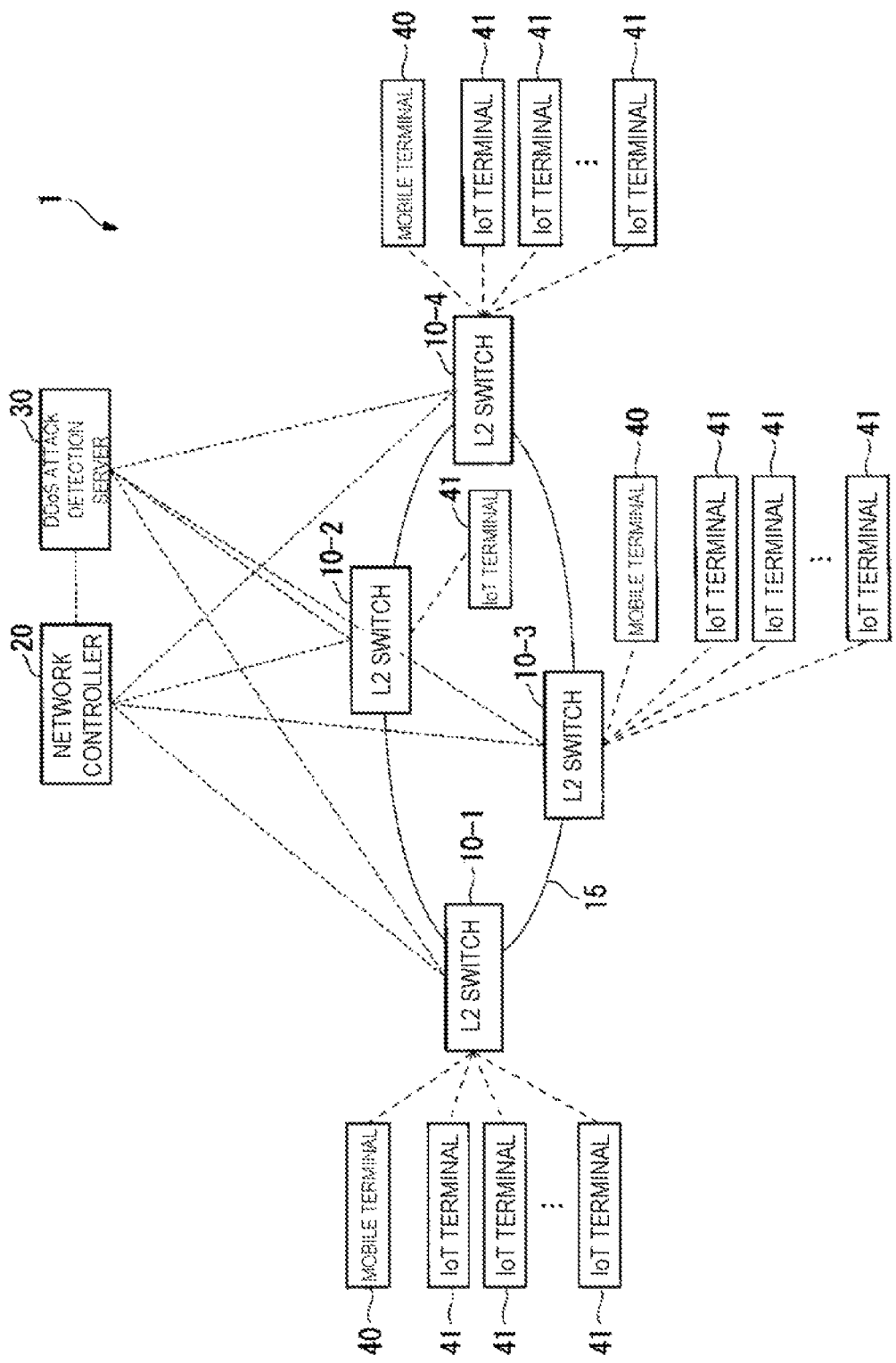
FIG. 1 is a diagram illustrating an overall configuration of a communication control system 1 according to an embodiment of the present disclosure.

FIG. 1 is a diagram illustrating the overall configuration of the communication control system 1 according to an embodiment of the present disclosure. As illustrated in FIG. 1, the communication control system 1 is configured to include a L2 network 15 having four layer 2 switches (hereinafter referred to as "L2 switches"), a network controller 20, a DDoS attack detection server 30, a plurality of mobile terminals 40, and a plurality of IoT terminals 41.

In the following description, the four L2 switches (the L2 switch 10-1, the L2 switch 10-2, the L2 switch 10-3, and the L2 switch 10-4) may simply be referred to as "L2 switch 10" when it is not necessary to distinguish between them.

The number of L2 switches 10 is not limited to four and may be any number of two or more.

As illustrated in FIG. 1, the L2 network 15 is formed by connecting the L2 switches 10 adjacent to each other.

Various devices are connected to each of the L2 switches 10. In the present embodiment, as an example, the mobile terminal 40 and the IoT terminal 41 are connected to the L2 switch 10. Note that the devices connected to the L2 switch 10 are not limited to the mobile terminal 40 and the IoT terminal 41, and may be other communicable devices. By connecting various devices to each of the L2 switches 10, data of various traffic (data amounts) flows in the L2 network 15.

As illustrated in FIG. 1, each of the L2 switches 10 is connected to the network controller 20 and the DDoS attack detection server 30. The network controller 20 and the DDoS attack detection server 30 are also connected to each other.

Summary of Communication Control Processing Hereinafter, summary of communication control processing by the communication control system 1 will be described.

Figure 2:
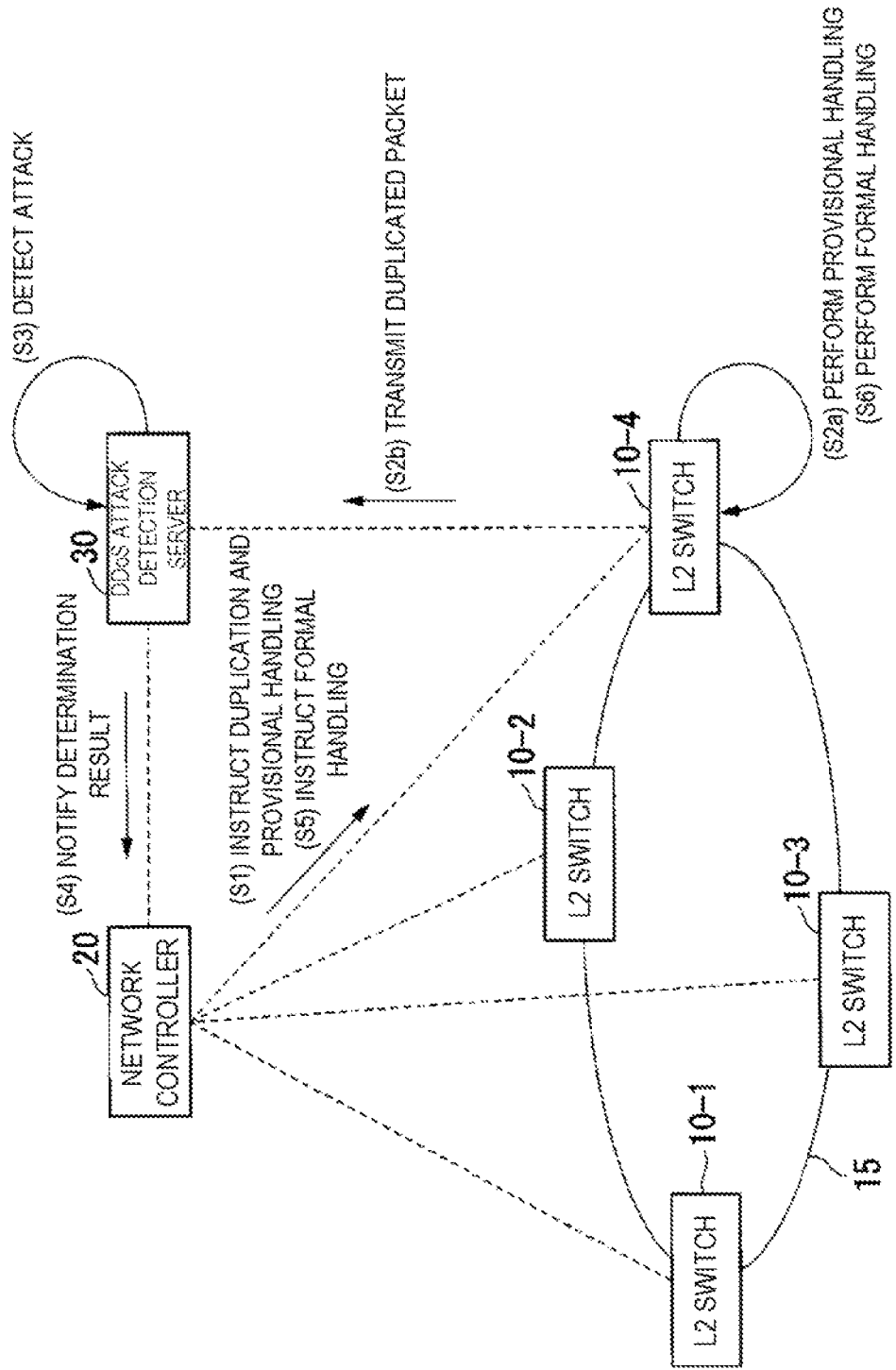
FIG. 2 is a diagram describing an overview of the communication control processing by the communication control system 1 according to the embodiment of the present disclosure.

FIG. 2 is a diagram describing an overview of the communication control processing by the communication control system 1 according to the embodiment. Hereinafter, a communication flow is simply referred to as "flow".

When detecting a flow suspected of being abnormal traffic (hereinafter referred to as a "suspected flow"), the network controller 20 outputs an instruction to cause the L2 switch 10 (L2 switch 10-4 in FIG. 2) to perform provisional handling, and duplicate the suspected flow and transfer the duplicated suspected flow to the DDoS attack detection server 30 (Step S1). A method of selecting the L2 switch 10 that is a destination of the instruction among the plurality of L2 switches 10 (10-1 to 10-4) will be described later.

When acquiring the instruction output from the network controller 20, the L2 switch 10 performs provisional handling (Step S2a). A method for provisional handling will be described later.

The L2 switch 10 also duplicates the suspected flow and transfers the duplicated suspected flow to the DDoS attack detection server 30 (Step S2b).

When acquiring the duplicated suspected flow from the L2 switch 10, the DDoS attack detection server 30 analyzes the duplicated suspected flow to determine whether or not the abnormal traffic is due to malicious attacks. The DDoS attack detection server 30 determines whether or not the abnormal traffic is due to malicious attacks (Step S3) and notifies the network controller 20 of a determination result (Step S4).

When acquiring the determination result from the DDoS attack detection server 30, the network controller 20 outputs an instruction to perform formal handling to the L2 switch 10 (L2 switch 10-4 in FIG. 2) to which the instruction to perform provisional handling is output in Step S1 (Step S5).

Note that the DDoS attack detection server 30 may output the instruction to perform formal handling to the L2 switch 10 to which the instruction to perform provisional handling is output in Step S1, based on the above determination result.

When acquiring the instruction output from the network controller 20, the L2 switch 10 performs formal handling (Step S6). A method for formal handling will be described later. The communication control system 1 is capable of monitoring and controlling abnormal traffic generated in the L2 network by performing the communication control processing as described above.

Note that, as described above, in the present embodiment, when detecting the suspected flow, the network controller 10 is configured to output the instruction to cause the L2 switch 10 to perform provisional handling, and duplicate the suspected flow and transfer the duplicated suspected flow to the DDoS attack detection server 30. Then, when acquiring the instruction to perform provisional handling, the L2 switch 10 is configured to perform provisional handling as well as duplicate the suspected flow and transfer the duplicated suspected flow to the DDoS attack detection server 30. The DDoS attack detection server 30 is configured to analyze the suspected flow acquired from the L2 switch 10 to determine whether or not abnormal traffic is due to malicious attacks. However, the communication control system 1 is not limited to the configuration described above.

For example, when detecting the suspected flow, the network controller 10 may output the instruction to cause the L2 switch 10 to perform provisional handling, and transfer identification information identifying the suspected flow to the DDoS attack detection server 30. The identification information used herein is, for example, VLAN ID (VID). Then, when acquiring the instruction to perform provisional handling, the L2 switch 10 may perform provisional handling. Then, the DDoS attack detection server 30 may acquire the suspected flow associated with the above identification information from monitored traffic, and analyze the suspected flow to determine whether or not the abnormal traffic is due to malicious attacks.

Figure 3:
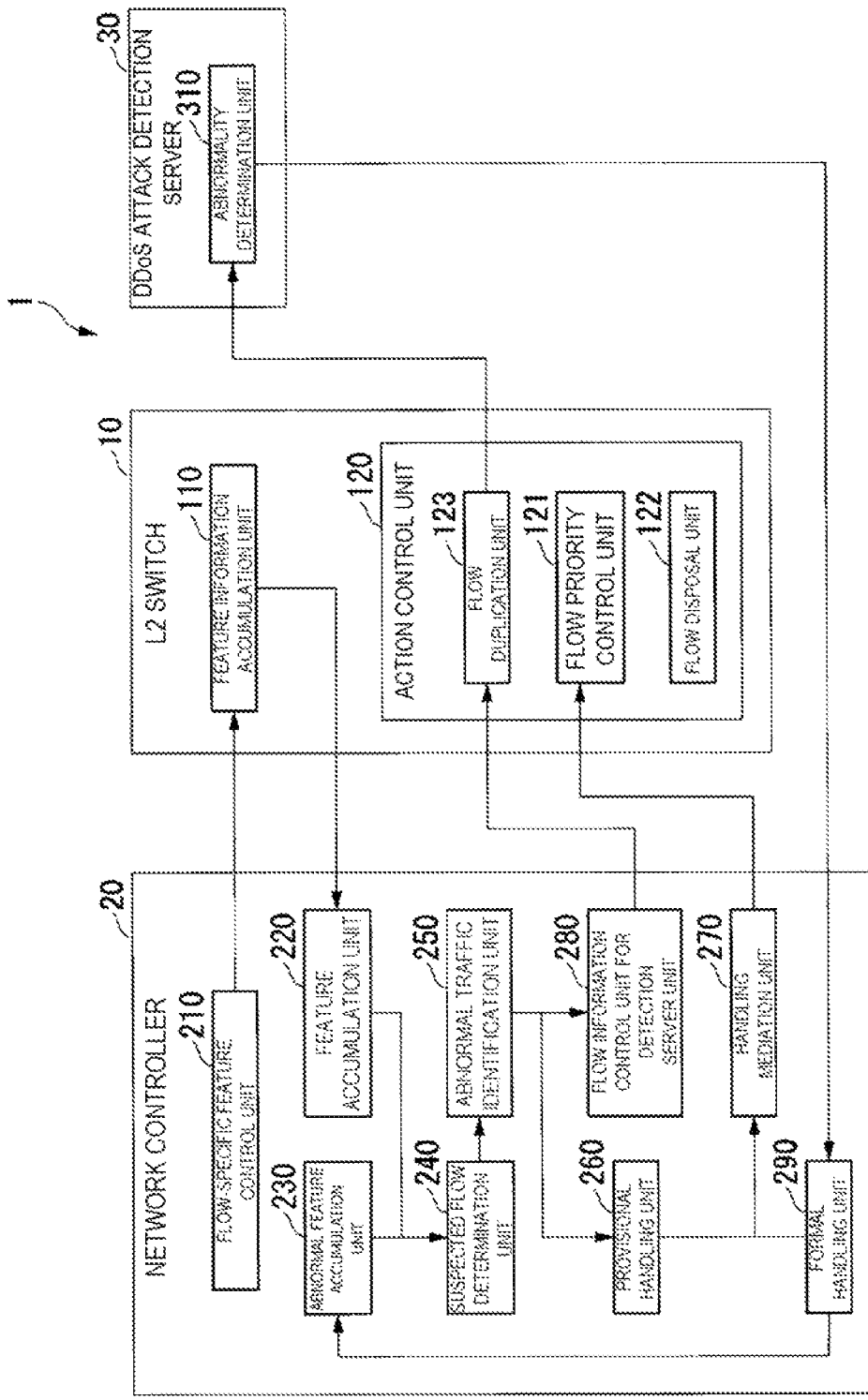
FIG. 3 is a block diagram illustrating a functional configuration of the communication control system 1 according to the embodiment of the present disclosure.

Functional Configuration of Communication Control Processing Hereinafter, a functional configuration of the communication control system 1 will be described. FIG. 3 is a block diagram illustrating the functional configuration of the communication control system 1 according to the embodiment of the present disclosure. As illustrated in FIG. 3, the communication control system 1 is configured to include the L2 switch 10, the network controller 20, and the DDoS attack detection server 30.

Note that, as illustrated in FIGS. 1 and 2, in the present embodiment, the communication control system 1 has the four L2 switches 10 (10-1 to 10-2), but only one L2 switch is illustrated in FIG. 3 for ease of explanation.

As illustrated in FIG. 3, the L2 switch 10 includes a feature information accumulation unit 110 and an action control unit 120. The action control unit 120 is configured to include a flow priority control unit 121, a flow disposal unit 122, and a flow duplication unit 123. In addition, as illustrated in FIG. 3, the network controller 20 is configured to include a flow-specific feature control unit 210, a feature accumulation unit 220, an abnormal feature accumulation unit 230, a suspected flow determination unit 240, an abnormal traffic identification unit 250, a provisional handling unit 260, a handling mediation unit 270, a flow information control unit for detection server 280, and a formal handling unit 290. As illustrated in FIG. 3, the DDoS attack detection server 30 is configured to include an abnormality determination unit 310.

The flow-specific feature control unit 210 outputs, to each of the L2 switches 10, a request to acquire information indicating a feature for each flow. The flow-specific feature control unit 210 repeatedly outputs the request at a predetermined cycle. In this manner, the network controller 20 periodically acquires information indicating the feature for each flow from each of the L2 switches 10.

The feature information accumulation unit 110 acquires the request output from the flow-specific feature control unit 210. In response to the acquired request, the feature information accumulation unit 110 outputs information indicating the feature collected for each flow to the network controller 20.

The feature used herein is, for example, the number of arrived frames, data rate, destination MAC (Media Access Control: MAC) address, source MAC address, Ethernet (registered trademark) type number, frame length, the number of session connection frames per flow, IP (Internet Protocol: IP) address, port number, or the like. Note that the request transmitted from the flow-specific feature control unit 210 includes a condition about the required feature.

As another means, when the flow-specific feature control unit 210 outputs a condition of the feature to be collected and a predetermined threshold as a request to the L2 switch 10, and the feature collected in the L2 switch 10 exceeds the threshold, the feature information accumulation unit 110 may aperiodically output information indicating the feature to the network controller 20. Note that, in this case, it is assumed that the frame is not encrypted.

It is contemplated that, when the frame is encrypted, the information indicating the feature is collected from a negotiation frame that performs negotiation and key exchange in the encryption scheme before initiating encrypted communication.

The feature accumulation unit 220 acquires the information indicating the feature for each flow output from the feature information accumulation unit 110. The feature accumulation unit 220 manages the acquired information indicating the feature (transfer communication flow feature), for example, by using a feature list LT1 illustrated in FIG. 4.

Figures 4, 5, 6:
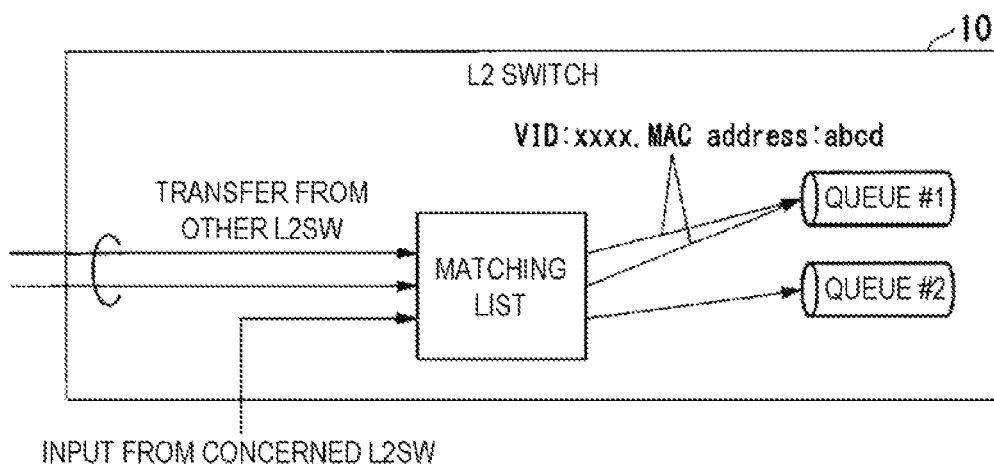
FIG. 4 is a table illustrating an example of a configuration of a feature list LT1 managed by a feature accumulation unit 220 of the communication control system 1 according to the embodiment of the present disclosure.
FIG. 5 is a table illustrating an example of a configuration of an abnormal feature list LT2 managed by the abnormal feature accumulation unit 230 of the communication control system 1 according to the embodiment of the present disclosure.
FIG. 6 is a flowchart illustrating processing of distinguishing traffic by the communication control system 1 according to the embodiment of the present disclosure.

FIG. 4 is a table illustrating an example of a configuration of the feature list LT1 managed by the feature accumulation unit 220 of the communication control system 1 according to the embodiment of the present disclosure. As illustrated in FIG. 4, values of a leftmost column of the feature list LT1 represent "flow ID" which is an ID (Identifier) identifying a flow. The feature list LT1 is a list indicating values of the feature for each flow and for each cycle. The feature list LT1 holds the values of the feature at past five cycles as time series data. As illustrated in FIG. 4, for example, the value of the feature at the time of a cycle 1 of the flow having the flow ID "A" is "$X_{A1}$", and the value of the feature at the time of a cycle 2, which is the time after the cycle 1 by one cycle, is "$X_{A2}$".

Returning to FIG. 3, the description will be continued.

The abnormal feature accumulation unit 230 manages the information indicating the feature for each flow when an abnormality occurs (abnormal communication flow feature), which is output from the feature information accumulation unit 110.

FIG. 5 is a table illustrating an example of a configuration of an abnormal feature list TL2 managed by the abnormal feature accumulation unit 230 of the communication control system 1 according to the embodiment of the present disclosure. As illustrated in FIG. 5, values of a leftmost column of the abnormal feature list LT2 represent "flow ID" which is an ID identifying a flow. The abnormal feature list LT1 is a list indicating values of the feature when an abnormality occurs for each flow and for each cycle. The abnormal feature list LT2 holds the values of the feature at the past five cycles as time series data. As illustrated in FIG. 5, for example, the value of the feature at the time of a cycle 1 of the flow having the flow ID "1" is "$X_{ddos1}$", and the value of the feature at the time of a cycle 2, which is the time after the cycle 1 by one cycle, is "$X_{ddos2}$".

Returning to FIG. 3, the description will be continued.

Each time the feature list LT1 managed by the feature accumulation unit 220 is updated, the suspected flow determination unit 240 (determination unit) compares the values of the time series feature included in the updated feature list LT1 with the values of the time series feature included in the abnormal feature list LT2 managed by the abnormal feature accumulation unit 230.

In following description, by way of example, the values of the feature at the five cycles for the flow having the flow ID "A" in the feature list LT1 illustrated in FIG. 4 (that is, "$X_{A1}$", "$X_{A2}$", "$X_{A3}$", "$X_{A4}$", and "$X_{A5}$") with the values of the feature at the five cycles for the flow having the flow ID "1" in the abnormal feature list LT2 illustrated in FIG. 5 (that is, "$X_{ddos1}$", "$X_{ddos2}$", "$X_{ddos3}$", "$X_{ddos4}$", and "$X_{ddos5}$") by using a squared error.

For example, the series of the feature for the flow having the flow ID "A" in FIG. 4 (that is, "$X_{A1}$", "$X_{A2}$", "$X_{A3}$", "$X_{A4}$", and "$X_{A5}$") is compared with the series of the feature for the flow having the flow ID "1" in FIG. 5 (that is, "$X_{ddos1}$", "$X_{ddos2}$", "$X_{ddos3}$", "$X_{ddos4}$", and "$X_{ddos5}$").

A difference MSE ($X_A$) between these two series can be represented by a mean squared error illustrated in an equation (1) below.

$$MSE(X_A) = (1/n)\Sigma(X_{A1} - X_{ddos1})^2 \quad (1)$$

When the mean squared error MSE($X_A$) is less than a predetermined threshold, the abnormal traffic identification unit 250 determines that the two series are similar to each other. In other words, it is determined that the series of the feature acquired from the feature information accumulation unit 110 is similar to the series of the feature acquired during the past occurrence of abnormality.

Note that the above comparison method using the mean squared error is an example. As another example, for example, the abnormal traffic identification unit 250 may compare the series of features in the feature list LT1 and the series of the features in the abnormal feature list LT2, and determine that the two series are similar to each other when the ratio in which the values of the features in the feature list LT1 are larger than the respective values of the features in the abnormal feature list LT2 exceeds a predetermined threshold (for example, 80%).

That is, when the threshold is 80%, for example, the abnormal traffic identification unit 250 compares the five feature values in the feature list LT1 illustrated in FIG. 4 (for example, "$X_{A1}$", "$X_{A2}$", "$X_{A3}$", "$X_{A4}$", and "$X_{A5}$") with of the five feature values in the abnormal feature list LT2 illustrated in FIG. 5 (for example, "$X_{ddos1}$", "$X_{ddos2}$", "$X_{ddos3}$", "$X_{ddos4}$", and "$X_{ddos5}$"), respectively, and determines that the two series are similar to each other when four or more feature values in the feature list LT1 illustrated in FIG. 4 are larger than the respective feature values in the abnormal feature list LT2.

In following description, among the flows included in the feature list LT1 illustrated in FIG. 4, the flow determined to be similar to any of the flows included in the abnormal feature list LT2 illustrated in FIG. 5 is a suspected flow.

The suspected flow determination unit 240 outputs information identifying the suspected flow to the abnormal traffic identification unit 250.

The abnormal traffic identification unit 250 acquires information identifying the suspected flow output from the suspected flow determination unit 240. The abnormal traffic identification unit 250 generates a matching list in which the information identifying the acquired suspected flow is associated with information identifying another L2 switch 10 transferring a frame to the L2 switch 10 that transmitted the flow determined as the suspected flow.

For example, the information identifying the suspected flow is the VLAN ID (VID). For example, the information identifying the other L2 switches 10 transferring frames to the L2 switch 10 that transmitted the flow determined as the suspected flow is the MAC address.

FIG. 6 is a diagram illustrating processing of distinguishing traffic by the communication control system 1 according to the embodiment of the present disclosure. As illustrated in FIG. 6, for example, the abnormal traffic identification unit 250 sets the matching list in which the VID is associated with MAC addresses to the L2 switch 10 that has transmitted the flow determined to be a suspected flow. This allows the traffic input from the concerned L2 switch 10 to be distinguished from the traffic transferred from the other L2 switches 10 for a particular VID.

FIG. 7 is a table illustrating an example of a configuration of a list LT3 held by the abnormal traffic identification unit 250 of the communication control system 1 according to the embodiment of the present disclosure. As in the list LT3 illustrated in FIG. 7, the abnormal traffic identification unit 250 holds a list in which the identification information identifying the L2 switch 10 is associated with the MAC addresses of the other L2 switches 10 connected to the concerned L2 switch 10.

Returning to FIG. 3, more descriptions will now be provided.

The abnormal traffic identification unit 250 outputs to the provisional handling unit 260 the information identifying the suspected flow output from the suspected flow determination unit 240.

The provisional handling unit 260 outputs an instruction that should be output to the L2 switch to the handling mediation unit 270 according to a handling policy.

The handling mediation unit 270 (the instruction unit) determines a handling strategy based on the input from the provisional handling unit 260 and the input from the formal handling unit 290.

The handling mediation unit 270 outputs the handling instruction to the action control unit 120 of the L2 switch 10. Note that a specific example of processing of determining the handling strategy will be described later.

The flow priority control unit 121 of the action control unit 120 acquires the handling instruction (first instruction) output from the handling mediation unit 270. Then, the flow priority control unit 121 relatively reduces the priority of the transfer processing for the suspected flow. Note that a specific example of the processing of controlling the priority will be described later.

Note that in the present embodiment, the flow priority is controlled as the handling policy. However, the present disclosure is not limited to this configuration, and the suspected flow may be disposed of as the handling policy. In this case, the flow disposal unit 122 of the action control unit 120 acquires the handling instruction output from the handling mediation unit 270. Then, the flow disposal unit 122 executes processing of disposing the suspected flow.

In addition, the abnormal traffic identification unit 250 outputs an instruction to duplicate the suspected flow to the flow information control unit for detection server 280. When acquiring the instruction output from the abnormal traffic identification unit 250, the flow information control unit for detection server 280 outputs to the DDoS attack detection server 30 an instruction (second instruction) to duplicate the suspected flow and outputs the duplicated suspected flow, to the flow duplication unit 123 of the action control unit 120.

When acquiring the instruction output from the flow information control unit for detection server 280, the flow duplication unit 123 duplicates the suspected flow and outputs the duplicated suspected flow to the DDoS attack detection server 30.

Note that the flow duplication unit 123 may be configured to duplicate and output the frame structure of the original suspected flow as it is, or may be configured to duplicate and output only a part of the data, such as the header of the frame of the original suspected flow.

The abnormality determination unit 310 acquires the duplicated suspected flow output from the flow duplication unit 123. The abnormality determination unit 310 analyzes the frame of the suspected flow output from the flow duplication unit 123 and determines whether or not the abnormality is due to DDoS attacks. The abnormality determination unit 310 outputs to the network controller 20 information indicating the determination result.

The formal handling unit 290 acquires information indicating the determination result output from the abnormality determination unit 310. Based on the determination result based on the acquired information, the formal handling unit 290 outputs to the handling mediation unit 270 information indicating handling for the identified suspected flow.

Furthermore, when the determination result based on the acquired information is the determination result indicating that the abnormality is due to DDoS attacks, the formal handling unit 290 outputs to the abnormal feature accumulation unit 230 the information indicating the identified suspected flow.

The abnormal feature accumulation unit 230 acquires the information indicating the suspected flow output from the formal handling unit 290. The abnormal feature accumulation unit 230 updates the abnormal feature list LT2 based on the information indicating the suspected flow acquired from the formal handling unit and the value of the feature corresponding to the suspected flow accumulated in the feature accumulation unit 220.

Note that instead of outputting the suspected flow duplicated by the flow duplication unit 123 of the L2 switch 10 to the DDoS attack detection server 30, the information identifying the suspected flow may be directly output to the DDoS attack detection server 30. In this case, based on the information indicating the suspected flow, the DDoS attack detection server 30 extracts the suspected flow from the traffic that can be monitored by itself, and analyzes the extracted suspected flow. Alternatively, the DDoS attack detection server 30 may be configured to compare the suspected flow with a list (not illustrated) of flows that have already been determined to be malicious traffic.

Processing of Selecting L2 Switch

An example of the processing of selecting the L2 switch 10 to be caused to perform handling will be described below.

Figure 8:
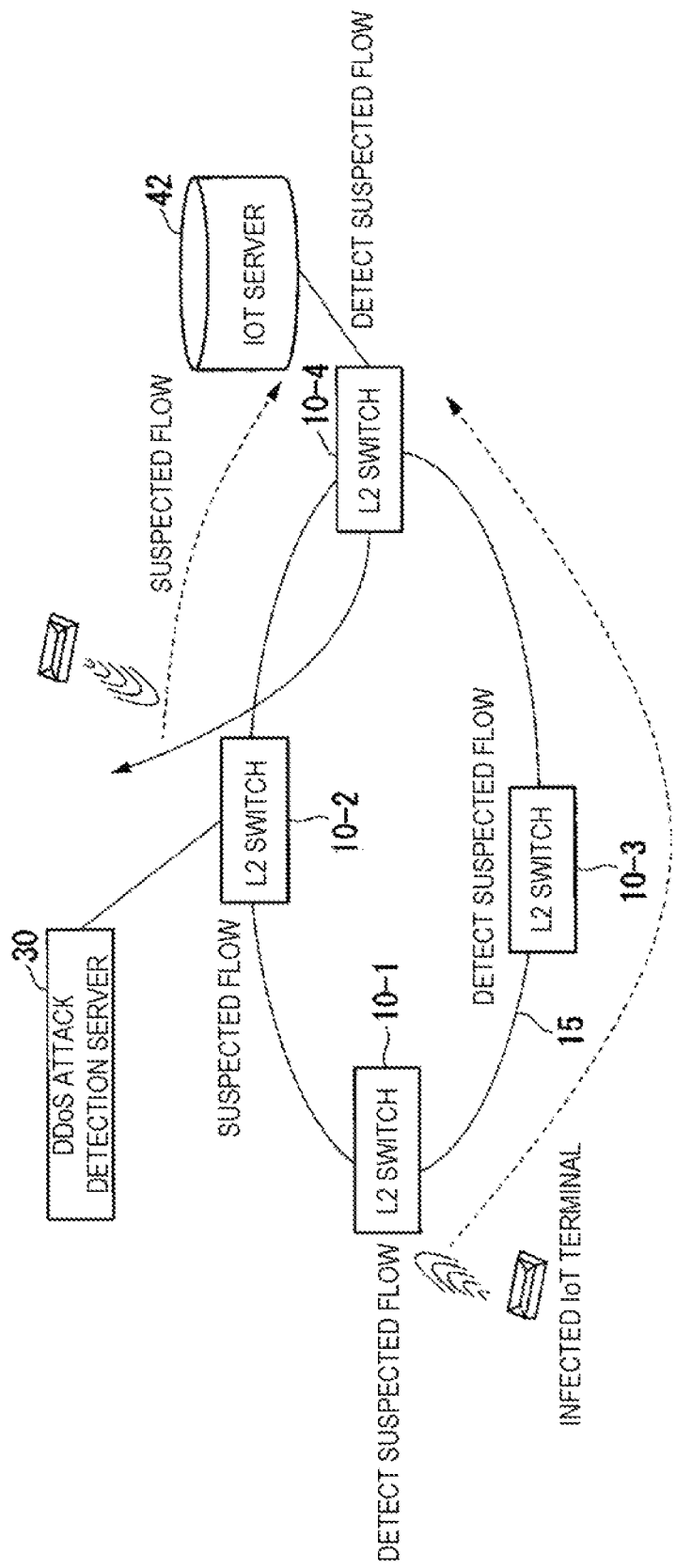
FIG. 8 is a diagram illustrating processing of selecting an L2 switch 10 by the communication control system 1 according to the embodiment of the present disclosure.

FIG. 8 is a diagram illustrating processing of selecting an L2 switch 10 by the communication control system 1 according to the embodiment of the present disclosure. FIG. 8 illustrates the processing of selecting the L2 switch 10 that duplicates the suspected flow to handle the DDoS traffic that flows from the L2 switch 10-1 and the L2 switch 10-2 toward the IoT server 42 across the L2 switch 10-4.

In FIG. 8, the DDoS attack detection server 30 is installed ahead of the L2 switch 10-2. Here, as an example, it is assumed that a suspected flow is detected in the L2 switch 10-1 and the L2 switch 10-2. The L2 switch 10 that duplicates the suspected flow is selected along the sequence of the processing illustrated in FIG. 9.

Figure 9:
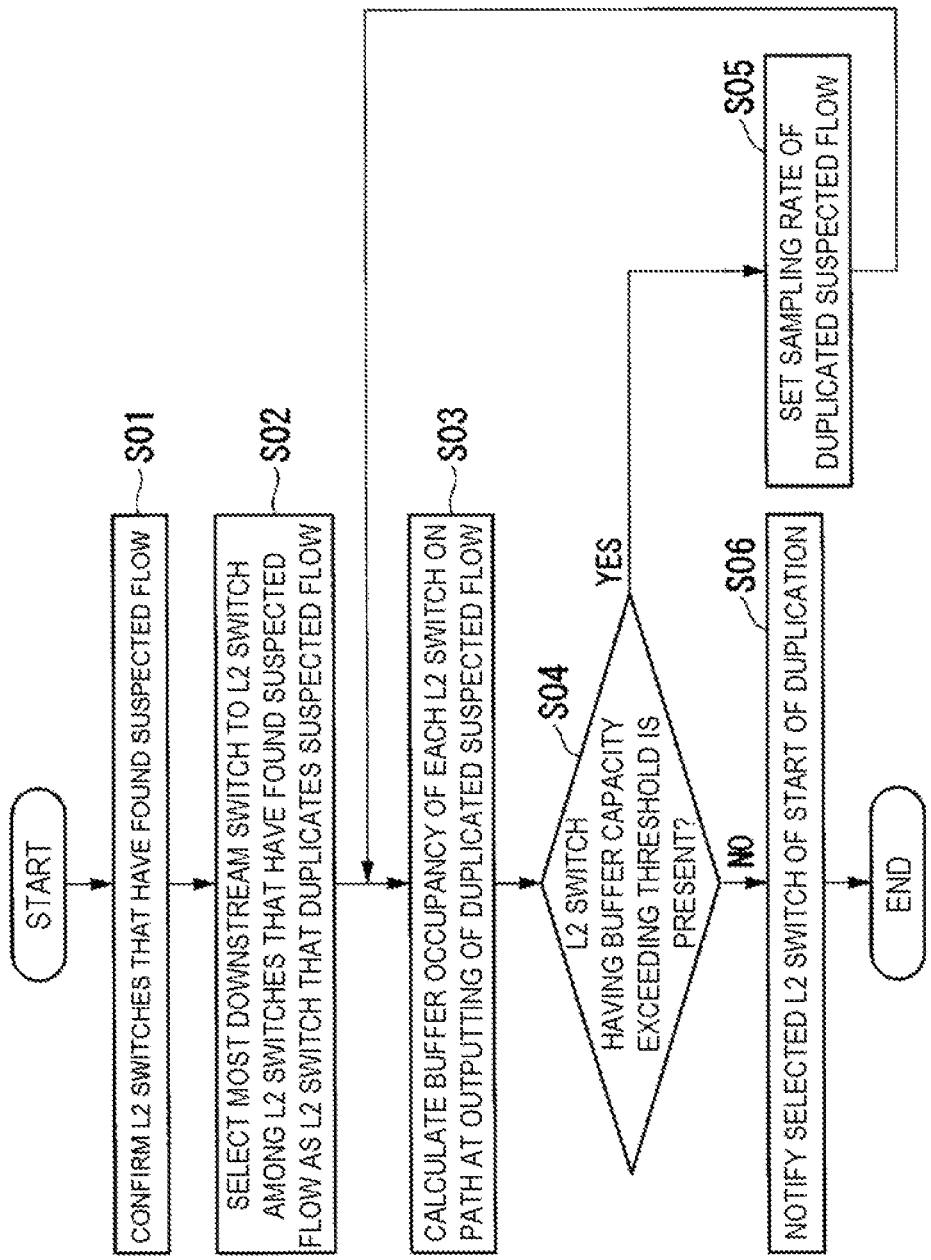
FIG. 9 is a flowchart illustrating a flow of the processing of selecting the L2 switch 10 by the communication control system 1 according to the embodiment of the present disclosure.

FIG. 9 is a flowchart illustrating the sequence of the processing of selecting the L2 switch by the communication control system 1 according to the embodiment of the present disclosure.

First, the network controller 20 confirms the L2 switch 10 that has detected a suspected flow from all of the L2 switches 10 (Step S01). The network controller 20 selects the L2 switch 10 located most downstream in transferring the flow from among the L2 switches 10 that detected the suspected flow, as the L2 switch 10 that duplicates the suspected flow (Step S02).

Here, the reason for selecting the most downstream L2 switch 10 is to duplicate and output the most aggregated suspected flow by selecting the L2 switch 10 in which the flows to be transferred are aggregated most.

Next, the network controller 20 calculates the buffer occupancy of each of the L2 switches 10 on the path, when the suspected flow duplicated by the L2 switch 10 is output to the DDoS attack detection server 30 (Step S02). The buffer occupancy is calculated by estimating the buffer capacity in consideration of an increase in queue length with respect to the buffer capacity of the current queue acquired from the L2 switch 10, which is expected when transferring the duplicated suspected flow.

When no L2 switch 10 having the buffer occupancy exceeding a predetermined threshold is present as a result of the calculation (No in Step S04), the network controller 20 notifies the selected L2 switch 10 of the start of duplication and a setting value of sampling rate. On the contrary, when the L2 switch 10 having the buffer occupancy exceeding a predetermined threshold is present as a result of the calculation (Yes in Step S04), the network controller 20 lowers the sampling rate of the duplicated suspected flow (Step S05), and calculates the buffer occupancy again (Step S03).

Control of Priority

Hereinafter, processing of lowering the priority for the suspected flow by the L2 switch 10 will be described.

Figure 10:
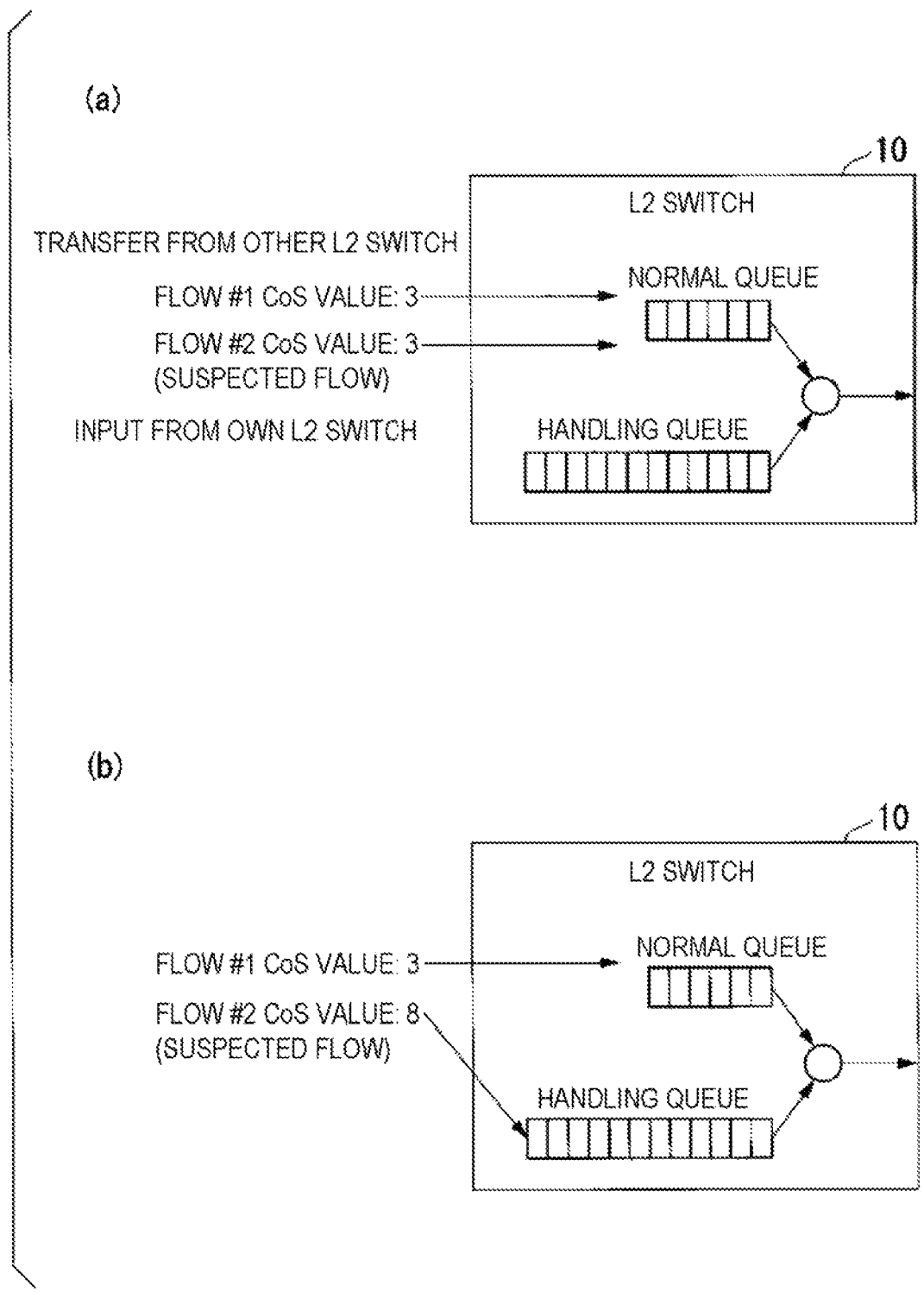
FIG. 10 is a diagram describing processing of controlling priority by the L2 switch 10 of the communication control system 1 according to the embodiment of the present disclosure.

FIG. 10 is a diagram for describing the processing of controlling the priority by the L2 switch 10 of the communication control system 1 according to the embodiment of the present disclosure. FIG. 10 illustrates the case where, of a flow #1 transferred from another L2 switch 10 and a flow #2 input from the own L2 switch 10, which are input to a normal queue, the flow #2 is determined as a suspected flow.

As illustrated in FIG. 10, the destination of the flow #2 is changed from the normal queue to a handling queue by rewriting a class of service (CoS) value (that is, changed from the state in FIG. 10(a) to the state in FIG. 10(b).

Figure 11:
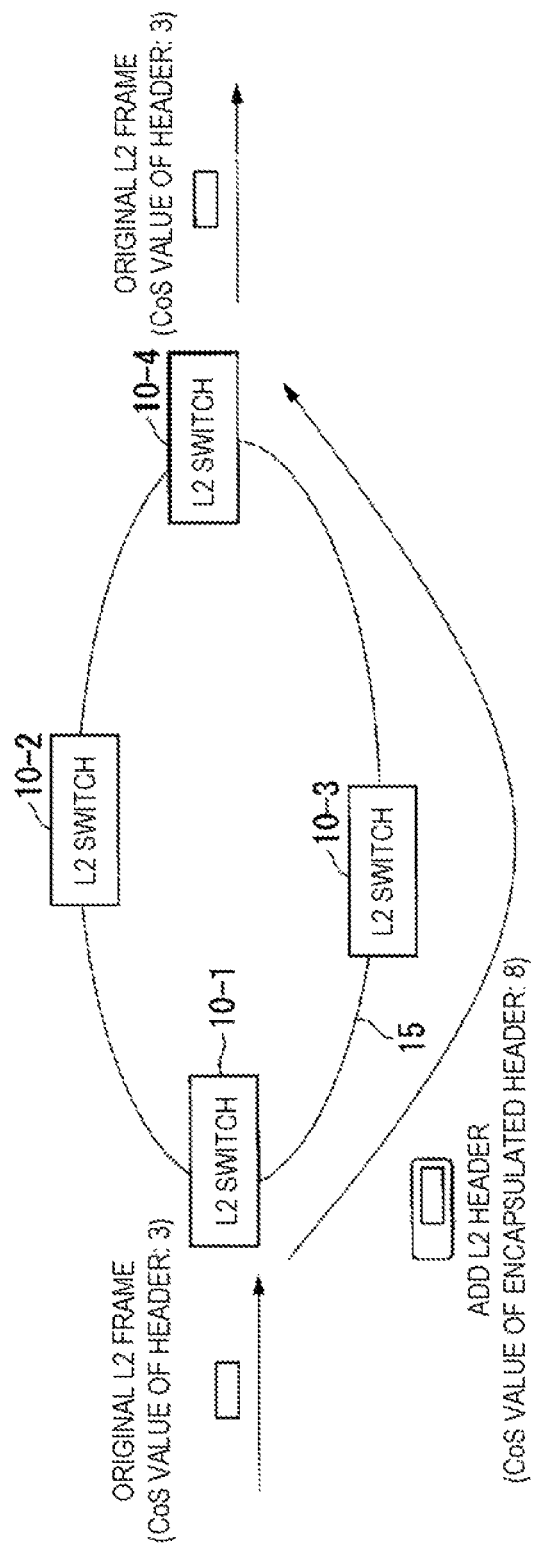
FIG. 11 is a flowchart describing processing of rewriting of a CoS value by the communication control system 1 according to the embodiment of the present disclosure.

FIG. 11 is a diagram for flowchart illustrating processing of rewriting the CoS value by the communication control system 1 according to the embodiment of the present disclosure. For example, as illustrated in FIG. 11, when an L2 frame, which is a target frame to be processed, is input into the L2 network 15, the L2 frame (first layer 2 frame) is further encapsulated by an L2 frame (second layer 2 frames). Then, upon encapsulation, the CoS value is rewritten to a value that is different from the CoS value assigned to the original frame (a value indicating lower priority).

The encapsulation of the L2 frame is performed at an inlet of the L2 network 15. The inlet of the L2 network 15 is a first node in the L2 network 15, at which the L2 frame passes in a path from a source to a destination. The encapsulated L2 frame is decapsulated at an outlet of the L2 network 15. The outlet of the L2 network 15 used herein is a last node in the L2 network 15, at which the L2 frame passes in the path from the source to the destination.

The flow #1 input to the normal queue and the flow #2 input to the handling queue are each given a transmission permission.

For example, by using weighted round robin for the normal queue and the handling queue, the transfer rate of the suspected flow is lowered to mitigate the traffic of the suspected flow. The provisional handling (temporary handling) is terminated when the mitigation or blockage of the identified suspected flow is determined.

State Transition of Communication Control Processing

Hereinafter, the state transition of the communication control processing will be described in detail.

Figure 12:
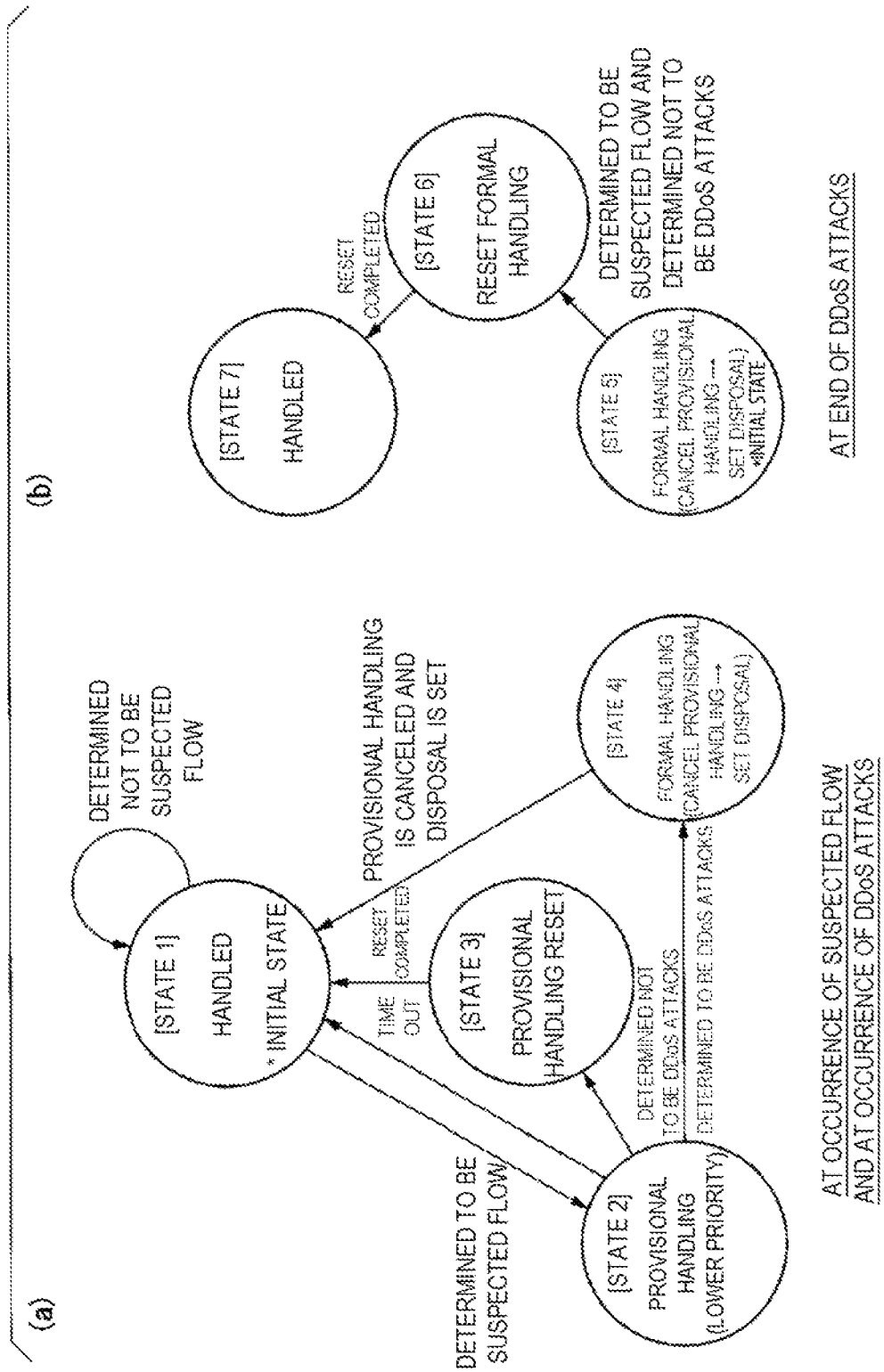
FIG. 12 is a diagram illustrating the state transition of communication control processing by the communication control system 1 according to the embodiment of the present disclosure.

FIG. 12 is a series diagram illustrating the state transition of the communication control processing by the communication control system 1 according to an embodiment of the present disclosure. FIG. 12(a) is the diagram illustrating the state transition during the occurrence of the suspected flow and the occurrence of DDoS attacks. FIG. 12(b) is the diagram illustrating the state transition at the end of the DDoS attack. The handling for any flow is performed according to the state transitions illustrated in following state transition diagrams.

First, the state transition diagram of FIG. 12(a) will be described.

As illustrated in FIG. 12(a), the initial state is a state 1. Here, when the abnormal traffic identification unit 250 determines that the transferred flow is not the suspected flow, the state of the communication control processing remains to be the state 1. On the contrary, when the abnormal traffic identification unit 250 determines that the transferred flow is the suspected flow, the state of the communication control processing transitions to a state 2.

In the state 2, the provisional handling is performed. Specifically, the flow priority control unit 121 relatively reduces the priority of the transfer processing for the suspected flow. The flow duplication unit 123 also duplicates the suspected flow and outputs the duplicated suspected flow to the DDoS attack detection server 30. Then, the abnormality determination unit 310 of the DDoS attack detection server 30 analyzes the frame of the suspected flow output from the flow duplication unit 123, and determines whether or not the abnormality is due to DDoS attacks.

When the abnormality determination unit 310 determines that the abnormality is not due to DDoS attacks, the state of the communication control processing transitions to a state 3. On the contrary, when the abnormality determination unit 310 determines that the abnormality is due to DDoS attacks, the state of the communication control processing transitions to a state 4. Note that when a time-out occurs in the determination of the abnormality determination unit 310, the state of the communication control processing returns to the state 1.

In the state 3, the provisional handling is reset. Specifically, the flow priority control unit 121 terminates the processing of relatively lowering the priority of the transfer processing for the suspected flow. Upon completion of resetting of the provisional handling, the state of the communication control processing returns to the state 1 (the handled state).

In the state 4, the formal handling is performed. Specifically, the flow priority control unit 121 terminates the processing of relatively lowering the priority of the transfer processing for the suspected flow. Then, it is set such that the flow disposal unit 122 disposes the flow determined to be due to DDoS attacks. Subsequently, the state of the communication control processing returns to the state 1 (handled state).

First, the state transition diagram of FIG. 12(b) will be described.

As illustrated in FIG. 12(b), the initial state is a state 5. Here, when the abnormal traffic identification unit 250 determines that the transferred flow is not the suspected flow and the abnormality determination unit 310 that the abnormality is not due to DDoS attacks, the state of the communication control processing transitions to a state 6.

In the state 6, the formal handling is reset. Specifically, the setting of disposing the flow determined to be due to DDoS attacks by the flow disposal unit 122 is cancelled.

Upon completion of the reset of the formal handling, the state of the communication control processing transitions to a state 7 (handled state).

Details of Provisional Handling

The provisional handling processing will be described below in detail.

Figure 13:
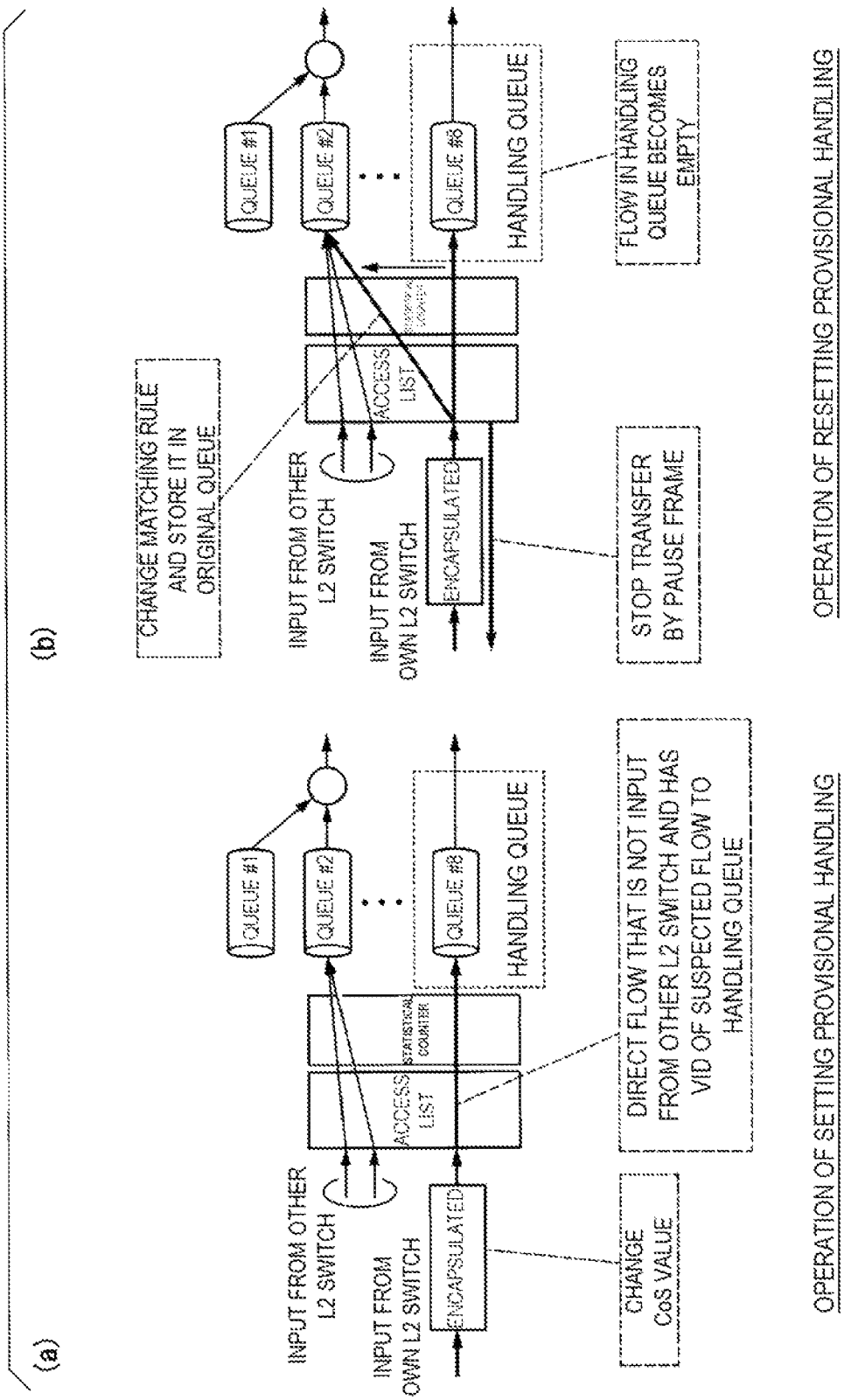
FIG. 13 is a diagram describing provisional handling processing by the communication control system 1 according to the embodiment of the present disclosure.

FIG. 13 is a diagram for describing the provisional handling processing by the communication control system 1 according to the embodiment of the present disclosure. FIG. 13(a) illustrates the operation of the L2 switch 10 at setting of the provisional handling. FIG. 13(b) illustrates the operation of the L2 switch 10 at resetting of the provisional handling.

As illustrated in FIG. 13(a), at setting of the provisional handling, the flow that is associated with the VID of the flow identified as the suspected flow, and is not the flow transferred from the other L2 switches 10 (that is, the flow in which the L2 switch 10 of its own becomes the first node in the network 15) is identified. The identified flow is then set to be stored in the handling queue of low priority. This setting is done, for example, by changing the CoS value acquired at encapsulating the L2 frame in the L2 switch 10.

It should be noted that, to extract flow that is not the flow transferred from other L2 switches 10, for example, the network controller 20 may recognize which port at which the subordinate L2 switches 10 are connected, and identify the flow that has flowed from a port that is not transfer ports from the other L2 switches 10.

In addition, as illustrated in FIG. 13(b), at resetting of the provisional handling, transfer of the flow is stopped by a Pause frame. Then, when the packet in the handling queue becomes empty, a matching rule is changed. This resets the L2 switch 10 such that the flow is stored in the original queue rather than the handling queue.

Details of Formal Handling

The formal handling processing will be described in detail below.

Figure 14:
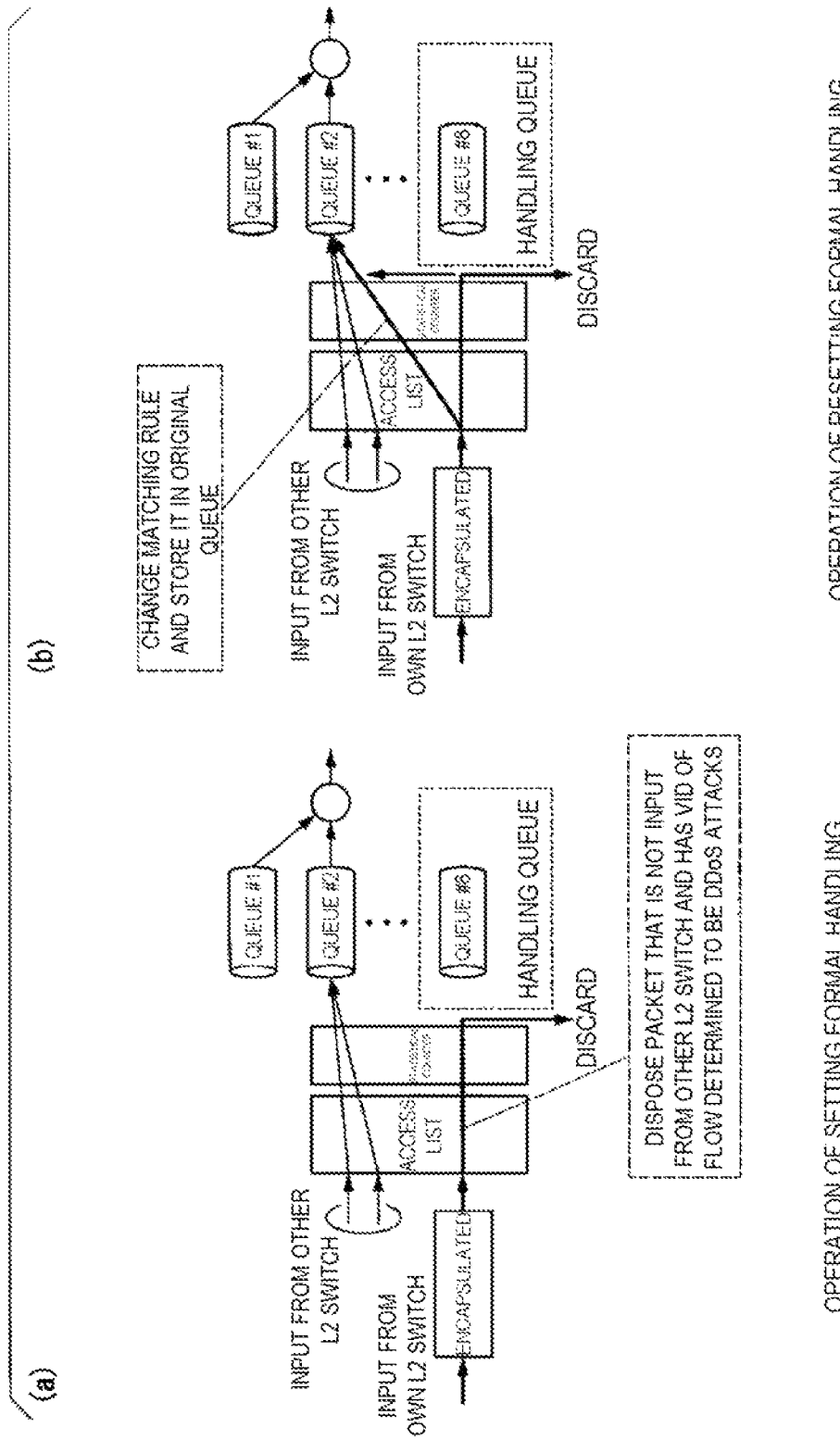
FIG. 14 is a diagram for describing formal handling processing by the communication control system 1 according to the embodiment of the present disclosure.

FIG. 14 is a diagram for describing the formal handling processing by the communication control system 1 according to the embodiment of the present disclosure. FIG. 14(a) illustrates the operation of the L2 switch 10 at setting of the formal handling. FIG. 14(b) illustrates the operation of the L2 switch 10 at resetting of the formal handling.

As illustrated in FIG. 14(a), at setting of the formal handling, the flow that is associated with the VID of the flow identified as the flow caused by DDos attacks, and is not the flow transferred from the other L2 switches 10 (that is, the flow in which the L2 switch 10 of its own becomes the first node in the network 15) is identified. Then, the L2 switch 10 is set such that the identified flow is disposed.

It should be noted that to extract flow that is not a flow that has been forwarded from other L2 switches 10, for example, the network controller 20 may recognize which ports the L2 switches 10 in place are connected, and identify the flow that has flowed from a port that is not a transfer port from the other L2 switch 10.

In addition, as illustrated in FIG. 14(b), at resetting of the formal handling, a matching rule is changed. This sets the flow to be stored in the original queue rather than the flow being disposed.

As described above, in the communication control system 1 according to the above-described embodiment, the plurality of L2 switches 10 are connected to the network controller 20 by via the L2 network 15. The network controller 20 compares the feature of the traffic acquired from the L2 switch 10 with the previously held feature of abnormal traffic. When it is determined that both are similar to each other as a result of the comparison, the network controller 20 transmits, to the L2 switch 10, an instruction to lower the priority of the frame of the concerned traffic and an instruction to transfer the duplicated frame of the abnormal traffic to the DDoS attack detection server 30. In this manner, the provisional handling for abnormal traffic is performed.

By providing the above-described configuration, the communication control system 1 according to the above-described embodiment can quickly handle the abnormal frame while suppressing load applied to the network.

Although the embodiments of the present disclosure have been described above with reference to the drawings, it is clear that the above embodiments are merely examples of the present disclosure, and the present disclosure is not limited to the embodiments described above. Thus, addition, omission, substitution, and other modifications of the constituent components may be made without departing from the spirit and scope of the present disclosure.

Note that the network controller 20 can be implemented by a computer and a program. The program can be recorded on a recording medium or provided via a network.

Part or all of the network controller 20 according to the above embodiment may be implemented by a computer. In such a case, the control apparatus and the wireless communication apparatuses may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 Communication control system
10 Switch

15 Network
20 Network controller
30 DDoS attack detection server
40 Mobile terminal
41 IoT terminal
42 IoT server
110 Feature information accumulation unit
120 Action control unit
121 Flow priority control unit
122 Flow disposal unit
123 Flow duplication unit
210 Flow-specific feature control unit
220 Feature accumulation unit
230 Abnormal feature accumulation unit
240 Suspected flow determination unit
250 Abnormal traffic identification unit
260 Provisional handling unit
270 Handling mediation unit
280 Flow information control unit
290 Formal handling unit
310 Abnormality determination unit

The invention claimed is:

1. A communication control system comprising a plurality of layer 2 switches and a network controller, the network controller comprising:
a processor; and
a storage medium having computer program instructions stored thereon, wherein the computer program instructions, when executed by the processor, perform to:
determine whether or not a transfer communication flow feature indicating a feature of a communication flow transferred by a layer 2 switch of the plurality of layer 2 switches is similar to an abnormal communication flow feature indicating a feature of a communication flow when an abnormality occurs, and
output to the layer 2 switch, when determining that the transfer communication flow feature is similar to the abnormal communication flow feature, a first instruction to lower priority of transfer processing for the communication flow having the transfer communication flow feature determined to be similar and a second instruction to duplicate the communication flow having the transfer communication flow feature determined to be similar.

2. The communication control system according to claim 1, wherein the feature is a number of arrived frames for each of the communication flows.

3. The communication control system according to claim 1, wherein the feature is a number of session connection frames for each of the communication flows.

4. The communication control system according to claim 1, wherein, when a mean squared error of the transfer communication flow feature and the abnormal communication flow feature is less than a predetermined threshold, the network controller determines that the transfer communication flow feature is similar to the abnormal communication flow feature.

5. The communication control system according to claim 1, wherein the computer program instructions further perform to:
output the second instruction to the layer 2 switch in which communication flows to be transferred are most aggregated.

6. The communication control system according to claim 1, wherein, when acquiring the first instruction, the layer 2 switch encapsulates a first layer 2 frame, which is a target frame to be processed, with a second layer 2 frame to which a lower priority value is assigned than the first layer 2 frame.

7. The communication control system according to claim 1, wherein the computer program instructions, when executed by the processor, perform to:
when determining that the transfer communication flow feature is similar to the abnormal communication flow feature,
output the first instruction to the layer 2 switch, and
only output the second instruction to a layer 2 switch, in which communication flows to be transferred are aggregated most, that is located most downstream in transferring the communication flow.

8. A network controller comprising:
a processor; and
a storage medium having computer program instructions stored thereon, wherein the computer program instructions, when executed by the processor, perform to:
determine whether or not a transfer communication flow feature indicating a feature of a communication flow transferred by a layer 2 switch of the plurality of layer 2 switches is similar to an abnormal communication flow feature indicating a feature of a communication flow when an abnormality occurs, and
output to the layer 2 switch, when determining that the transfer communication flow feature is similar to the abnormal communication flow feature, a first instruction to lower priority of transfer processing for the communication flow having the transfer communication flow feature determined to be similar and a second instruction to duplicate the communication flow having the transfer communication flow feature determined to be similar to the layer 2 switch.

9. A non-transitory computer readable medium which stores a program causing a computer to function as the network controller according to claim 8.

* * * * *